United States Patent
Laue et al.

(10) Patent No.: US 11,612,136 B2
(45) Date of Patent: Mar. 28, 2023

(54) MILK CART WITH A CLEANING FUNCTION

(71) Applicants: Hans-Joachim Laue, Osterroenfeld (DE); Hans Joachim Holm, Westerroenfeld (DE)

(72) Inventors: Hans-Joachim Laue, Osterroenfeld (DE); Hans Joachim Holm, Westerroenfeld (DE)

(*) Notice: Subject to any disclaimer, the term of this patent is extended or adjusted under 35 U.S.C. 154(b) by 0 days.

(21) Appl. No.: 16/680,742

(22) Filed: Nov. 12, 2019

(65) Prior Publication Data

US 2020/0146260 A1    May 14, 2020

(30) Foreign Application Priority Data

Nov. 12, 2018  (EP) ..................... 18205638

(51) Int. Cl.
*A01J 5/003* (2006.01)
*A01J 7/02* (2006.01)
*A01K 9/00* (2006.01)

(52) U.S. Cl.
CPC ............ *A01K 9/00* (2013.01); *A01J 5/003* (2013.01); *A01J 7/027* (2013.01)

(58) Field of Classification Search
CPC ............ A01J 5/003; A01J 7/02; A01J 7/027
USPC ................ 119/14.02, 14.04, 14.11
See application file for complete search history.

(56) References Cited

U.S. PATENT DOCUMENTS

| | | | | |
|---|---|---|---|---|
| 2,873,722 A * | 2/1959 | Duncan | ................ | A01J 9/00 119/14.09 |
| 3,236,248 A * | 2/1966 | Ray | ................ | B08B 9/093 134/58 R |
| 3,385,265 A * | 5/1968 | Schrader | ................ | A01J 7/022 119/14.18 |
| 3,456,590 A * | 7/1969 | Sparr, Sr. | ................ | A01J 5/04 417/36 |
| 3,665,941 A * | 5/1972 | Griparis | ................ | B08B 9/093 134/58 R |
| 3,867,906 A * | 2/1975 | Johnson | ................ | A01K 13/001 119/671 |
| 4,034,711 A * | 7/1977 | Bender | ................ | A01J 5/003 119/14.11 |
| 4,061,504 A * | 12/1977 | Zall | ................ | A01J 7/022 134/95.1 |
| 4,135,255 A * | 1/1979 | Menendez | ................ | E03D 9/08 4/448 |

(Continued)

FOREIGN PATENT DOCUMENTS

DE  202005012843 U1  10/2005
DE  202009001542 U1  6/2009

*Primary Examiner* — David J Parsley
(74) *Attorney, Agent, or Firm* — Barclay Damon LLP

(57) ABSTRACT

A milk cart comprises a chassis, a storage tank coupled to the chassis, and a conveyor system comprising an exit configured to connect to a return line that terminates inside the storage tank. The return line comprises a first portion extending vertically towards a bottom of the inside of the storage tank, a second portion extending vertically in a direction towards a top of the inside the storage tank, and a base portion extending from the first portion to the second portion. The second portion is positioned at a lateral distance from an interior of a wall of the storage tank and further comprises an upper end comprising at least one opening.

17 Claims, 2 Drawing Sheets

(56) References Cited

U.S. PATENT DOCUMENTS

| | | | | |
|---|---|---|---|---|
| 4,174,721 | A * | 11/1979 | Wuchse | A01J 7/022 |
| | | | | 119/14.18 |
| 4,432,700 | A * | 2/1984 | Icking | A01J 5/042 |
| | | | | 119/14.07 |
| 4,803,955 | A * | 2/1989 | Gonsalves | A01K 9/00 |
| | | | | 119/71 |
| 8,714,411 | B2 * | 5/2014 | Gallaher | A45F 3/16 |
| | | | | 222/146.6 |
| 9,642,334 | B2 * | 5/2017 | Dole | A01J 7/04 |

* cited by examiner

MILK CART WITH A CLEANING FUNCTION

CROSS REFERENCE TO RELATED INVENTION

This application is based upon and claims priority to, under relevant sections of 35 U.S.C. § 119, European Patent Application No. 18 205 638.2, filed Nov. 12, 2018, the entire contents of which are hereby incorporated by reference.

BACKGROUND

The invention relates to a milk cart with a chassis, a storage tank for liquid foodstuff and a conveyor system which comprises an inlet configured to connect to an outlet of the storage tank and further comprising an exit configured to connect to a return line that terminates inside the storage tank.

Milk carts of this kind are utilized in the rearing of livestock on farms, in particular for supplying liquid foodstuff to calves. To this end the storage tanks are filled with liquid foodstuff and driven from one feeding station to the next. At each feeding station a feeder, for example a trough, a feeding bucket or a feeding bottle is filled by means of the conveyor system, the exit of which is connected to a delivery device for this purpose.

A milk cart of this kind is disclosed in the document DE 20 2005 012 843 U1. The disclosed milk cart is distinguished by a special cleaning function in which the liquid inside the storage tank is cycled through the delivery device and back into the storage tank by the conveyor system. This allows a cleaning liquid inside the storage tank to be conveyed in an open circuit to flush all elements of the milk cart that come into contact with the liquid food. The arrangement of a spray nozzle inside the storage tank is also described, with which the entire interior of the storage tank, including a lid closing it, can be cleaned.

The object of the invention is therefore to improve a milk cart of the type mentioned above so as to further simplify the work involved in rearing livestock.

The invention is based on the recognition that, in connection with the feeding of livestock, not only the milk cart itself must be regularly cleaned, but also the containers assigned to the individual animals or groups of animals into which the food rations are filled with the milk cart, i.e. in particular feeding buckets and feeding bottles. Conventionally the feeding buckets or feeding bottles are collected for this purpose and thoroughly cleaned in a suitable place. The feeding buckets or bottles must then be transported back to the feeding areas. This procedure is very laborious and time-consuming. In addition, there is a danger that the switching of the feeding buckets or bottles may lead to the transfer of diseases from one animal to another in the event of incomplete cleaning. The inventors have recognized that both disadvantages can be avoided by adding an additional cleaning function to a milk cart and using it to clean the feeding buckets or bottles.

BRIEF SUMMARY OF THE INVENTION

The milk cart comprises a chassis, a storage tank for a liquid foodstuff and a conveyor system comprising an inlet connected to an outlet of the storage tank and an exit which is connected or can be connected to a return line terminating in the storage tank, wherein the return line has an end section which leads from bottom to top inside the storage tank, is arranged at a lateral distance from a tank wall and has at least one opening at its upper end.

The chassis comprises or is coupled to several wheels so that the milk cart can be moved easily. The milk cart can be equipped with a drive that drives at least one of the wheels of the chassis and/or with at least one steerable wheel.

The storage tank has a capacity to hold a large quantity of liquid food, for example in the range from 80 to 500 liters. It can have an approximately cylindrical, upright shape. The storage tank may have a lid with which an upper opening of the storage tank can be closed, in particular a lid which is mounted pivotally on one side. The liquid food may in particular be whole milk or milk replacer, the milk cart being equipped with a stirring device or a recirculation system to support the mixing process of the milk replacer. The milk cart may further have a heating device for tempering and/or pasteurizing the liquid food.

The conveyor system may comprise a pump, in particular an electrically driven pump. A dosing control can also be assigned to the conveyor system so that automatically preset quantities can be dosed out when the liquid food is distributed. For this purpose, the milk cart can be equipped with a delivery device which is connected to an exit of the conveyor system. The delivery device can be a simple hose, optionally connected to, for example, a dosing arm or a nozzle. The storage tank has an outlet, especially in a tank bottom, which is connected to the inlet of the conveyor system via a conduit.

A return line is connected or can be connected to the output of the conveyor system, which terminates in the storage tank. Through this return line, the liquid taken up in the storage tank can be circulated in an open circuit with the aid of the conveyor system. This can be used for mixing the liquid food or in combination with a cleaning liquid for cleaning the milk cart (as in the case of the milk cart known from publication DE 20 2005 012 843 U1).

In an embodiment of the milk cart, the return line has an end section leading from bottom to top within the storage tank, which is arranged at a lateral distance from a tank wall and has at least one outlet opening at its upper end. The end section may be straight and vertical. However, this is not mandatory, a curved and/or angled configuration and/or an inclined arrangement of the end section are also feasible. Through the end section leading from bottom to top, a cleaning liquid can be conveyed with the conveying device through the return line to the outlet opening, whereby the upper end of the end section, at which the at least one outlet opening is formed, is arranged largely free-standing within the storage tank. This makes it easy to put a teat bucket, feeding bucket or bottle with its opening over the upper end of the end section so that the inside of the teat bucket, feeding bucket or bottle can be cleaned by the cleaning fluid emerging from the at least one opening. This allows the cleaning to be carried out directly at the respective feeding site and the feeding bucket or bottle can then remain at the same feeding site. This prevents the transmission of diseases from one animal to another. In addition, the long distances between the feeding area and the cleaning device, which are unavoidable in today's cleaning practice, are eliminated.

Due to the large capacity of the storage tank, a relatively large amount of cleaning fluid can be accommodated. The residual quantities of feeding liquid or other impurities in a feeding bottle or bucket which is to be cleaned are small compared to the amount of cleaning liquid, so that a larger number of feeding buckets or bottles can be cleaned in succession without having to replace the cleaning liquid.

A further advantage of the large storage capacity is that a warm or hot cleaning liquid usually does not cool down before the intended number of feeding buckets or bottles have been cleaned. If the milk cart is equipped with a heating device, this can additionally be used to heat the cleaning liquid.

After all of the feeding buckets or bottles that need to be cleaned have been cleaned, the cleaning fluid can be drained off. After a subsequent cleaning of the milk cart itself, it can immediately be used for a subsequent distribution of liquid food.

In one aspect, the at least one opening is arranged at a height in the range from 0 cm to 30 cm below an upper rim of the storage tank. In this arrangement, the upper end of the end section is particularly easy for an operator to access. At the same time, it is avoided that cleaning fluid sprays out of the storage tank from at least one opening. Overall, particularly ergonomic and clean working is made possible.

In an embodiment, the lateral distance of the end section from the tank wall to all sides is at least 10 cm. Preferably, the lateral distance from the tank wall can be even greater and, for example, be at least 15 cm or at least 20 cm. In any case, the end section stands free so that conventional teat buckets, feeding buckets or bottles can simply be placed over it, rotated and moved sideways to allow complete cleaning.

In an embodiment, the end section is arranged at a lateral distance from a central vertical axis of the storage tank. This lateral distance from the central vertical axis is selected in such a way that there is sufficient clearance between the end section and the farthest area of the tank wall to allow a feeding bucket or bottle to be completely immersed in the cleaning liquid. If, for example, the storage tank has an internal diameter of 60 cm, the end section can be arranged at a distance of 10 cm from the central vertical axis of the storage tank. The minimum lateral distance to the tank wall is then about 20 cm, the maximum about 40 cm. This enables both convenient handling of a feeding bucket placed on the end section and complete immersion of the feeding bucket next to the end section.

In an embodiment, the end section has a minimum length of 15 cm. The length of the end section can preferably be even longer and, for example, be at least 20 cm, at least 25 cm or at least 30 cm. This ensures that a feeding bucket or bottle can be placed over the end section so that the upper end of the end section is close to the bottom of the feeding bucket or bottle. This promotes a good cleaning effect, even with residues that have dried to the bottom of the bucket of bottle.

In an embodiment, the return line has a U-shaped section arranged within the storage tank, wherein one bracket of the U-shaped section forms the end section and the other bracket of the U-shaped section is arranged near the tank wall. A base of the U-shaped section connecting the lower ends of the two brackets is then arranged relatively deep in the storage tank, particularly below a fill level of cleaning liquid in the storage tank. This prevents contamination of the base of the U-shaped section. The bracket located near the tank wall is sufficiently far from the end section so that it does not interfere with the cleaning work. In particular, it may be positioned at a distance from the tank wall of 10 cm or less or 5 cm or less.

In an embodiment, a section of the return line arranged outside the storage tank is formed by a delivery device which is connected to the exit of the conveying device. The delivery device may have a hose and/or a dosing arm and/or a nozzle. When distributing a liquid food product, the delivery device can easily be used to fill the individual feeding containers. In cleaning mode, the delivery device becomes part of the return line. For this purpose, a free end of the dispenser can be inserted into a receptacle, which is arranged in particular on the outside of the storage tank. In this way, an essentially impermeable connection is established between the delivery device and the subsequent sections of the return line. It is possible to switch between feed delivery mode and cleaning mode without having to operate valves or connect additional line sections to the conveyor system.

In an embodiment, the return line has a middle section which is passes through the tank wall or around an upper rim of the tank wall. This allows the liquid conveyed by the conveyor system to be returned to the storage tank and to the end section without providing an additional opening in the tank bottom of the storage tank.

In an embodiment, the middle section of the return line outside the tank can be connected to the delivery device. For this purpose, the middle section of the return line may have a suitable receptacle into which a free end of the discharge device is inserted, as explained above.

In an embodiment, a section of the return line arranged inside the storage tank can be detachably connected to the middle section of the return line and/or detachably attached to the middle section of the return line. The section of the return line arranged inside the storage tank can in particular be the U-shaped section described above. For connection and/or attachment to the middle section of the return line, for example, a threaded connection may be formed on the middle section. Preferably there is a coupling which allows the connection to be made and released easily and without tools, in particular with a quick coupling and/or a quick-release fastener, which can be used, for example, a union nut, a clamp or a bayonet fastener. In any case, the section of the return line located inside the storage tank can be easily inserted and removed, for example to switch between dispensing and cleaning operations or to retrofit a conventional milk cart with the cleaning function.

In an embodiment, a filter is arranged at the outlet of the storage tank and/or in a connecting conduit between the outlet and the inlet of the conveyor system. The filter may be a coarse filter or a dirt-filter and may have, for example, a sieve or a grid. The filter prevents coarse impurities from entering the conveyor system from a cleaned teat feeder and damaging it or clogging at least one opening.

In an embodiment, the milk cart is equipped with a controller with which the conveyor system can be activated in a cleaning mode for a predetermined period of time. For example, the predetermined period can range from 5 seconds to 90 seconds, preferably around 15 to 20 seconds. With the help of the controller, the specified period can be set to a desired value. The activation of the conveyor system for the predetermined period is preferably carried out with an easily accessible actuating element, in particular a button on a handle 16 or another easily accessible point on the outside of the milk cart such as the grip 38. The period can be specified to ensure thorough cleaning of the type of container to be cleaned.

In an embodiment, a spray nozzle is arranged at the upper end of the end section and has at least one opening, the spray nozzle being designed to generate a plurality of laterally and/or upwardly directed liquid jets when a liquid is conveyed with the conveying system. For this purpose, the openings can be matched to the conveying capacity of the conveying system. A simple and complete cleaning is facilitated. The spray nozzle may preferably have an outer diameter of 5 cm or less, for example 4 cm or less. In this case, even teat containers with a relatively small opening, especially teat bottles with a screw cap or clamp cap with which the teat is fixed, can be optimally cleaned.

The above-mentioned task is also accomplished by the usage of a milk cart. The milk cart is used for cleaning a feeding bucket or a feeding bottle, the milk cart having a chassis, a storage tank for a liquid foodstuff and a conveyor system comprising an inlet connected to an outlet of the storage tank, the storage tank being filled with a cleaning solution and the feeding bucket or bottle being placed inside the storage tank and cleaned by means of a liquid jet generated by the conveyor system.

For the characteristics and advantages of this use of a milk cart, see the explanations above. The cleaning liquid may in particular be hot or warm water with or without added detergent. The jet of liquid may be produced by means of a fixed spray nozzle. The storage tank may preferably be filled to a level just below the end of the return line.

In an embodiment, a return line connected to an outlet of the conveyor system is used for cleaning, which has a fixed, upwardly pointing end section with at least one opening for the cleaning solution. For the characteristics and advantages of this solution, see the explanations of the milk cart above.

BRIEF DESCRIPTION OF THE DRAWINGS

The invention is explained in more detail below using an exemplary design shown in two figures.

DETAILED DESCRIPTION OF THE INVENTION

Figure 1:
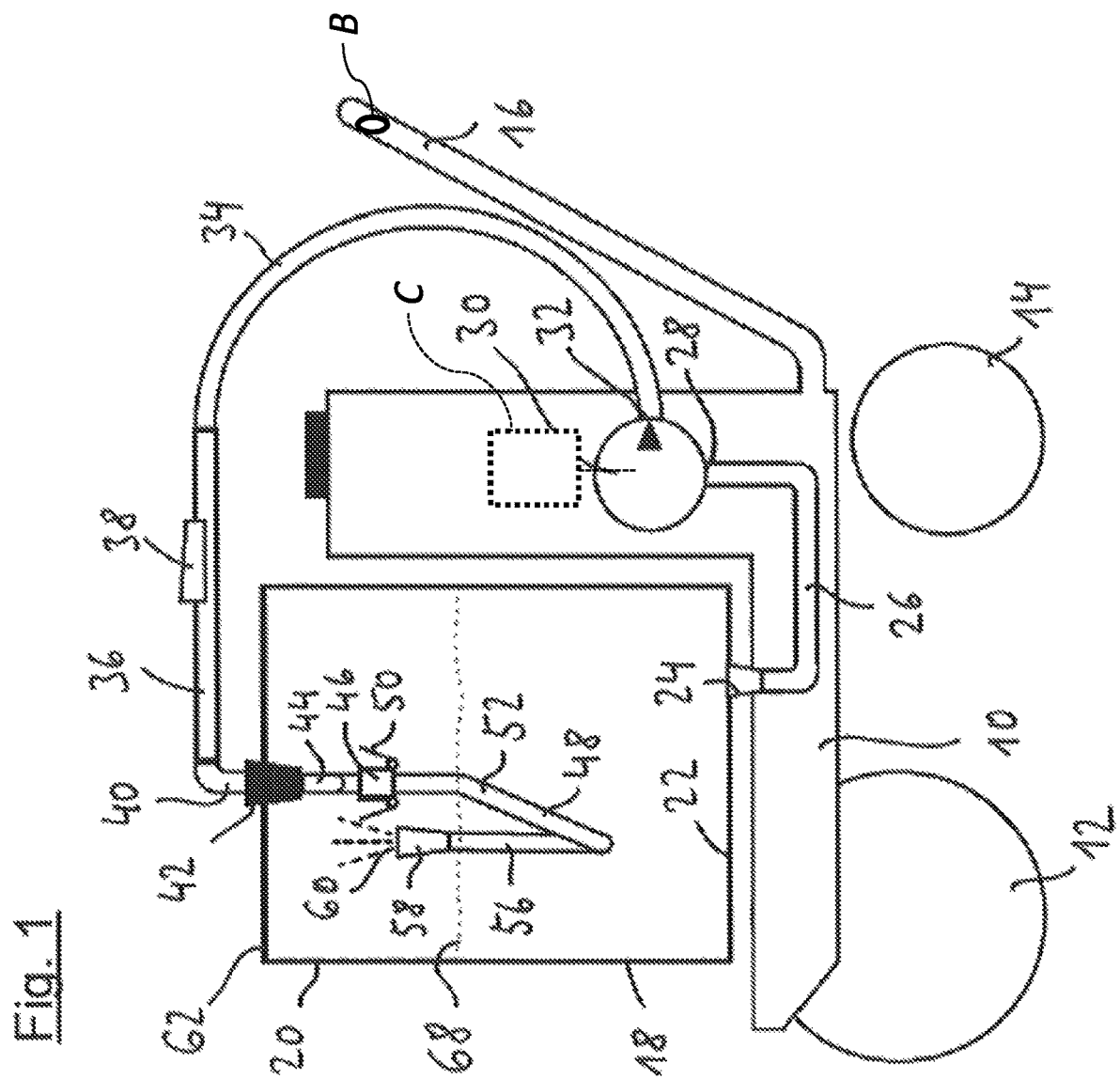
FIG. 1 shows a side schematic view of an embodiment of a milk cart.

The embodiment of a milk cart illustrated in FIG. 1 has a chassis 10 with two front wheels 12 and two steerable rear wheels 14. The chassis comprises a handlebar 16 for pulling or pushing the milk cart.

On the chassis 10 a storage tank 18 for liquid food is arranged. The storage tank 18 has the shape of an upright circular cylinder with a lateral tank wall 20 and a tank bottom 22. An outlet 24 is arranged in the tank bottom 22, which is connected via a conduit 26 to an inlet 28 of a conveyor system 30, which is an electrically driven pump. A filter not shown is arranged at the outlet 24.

The exit 32 of the conveyor system 30 is connected to a delivery device comprising a hose 34 and a dosage arm 36 with a grip 38 and a front end 40. This delivery device forms a section of a return line arranged outside the storage tank 18.

The front end 40 of the dosage arm 36 is inserted into a receptacle 42. The receptacle 42 forms an external connection to a middle section 44 of the return line which passes through the tank wall 20. This can be seen better in FIG. 2.

A coupling 46 is disposed at the end of the middle section 44 of the return line located within the storage tank 18, by means of which a U-shaped section 48 of the return line located within the storage tank 18 is connected to and secured to the middle section 44. The coupling 46 has two small locking levers 50 which allow this connection to be made and released without tools.

Figure 2:
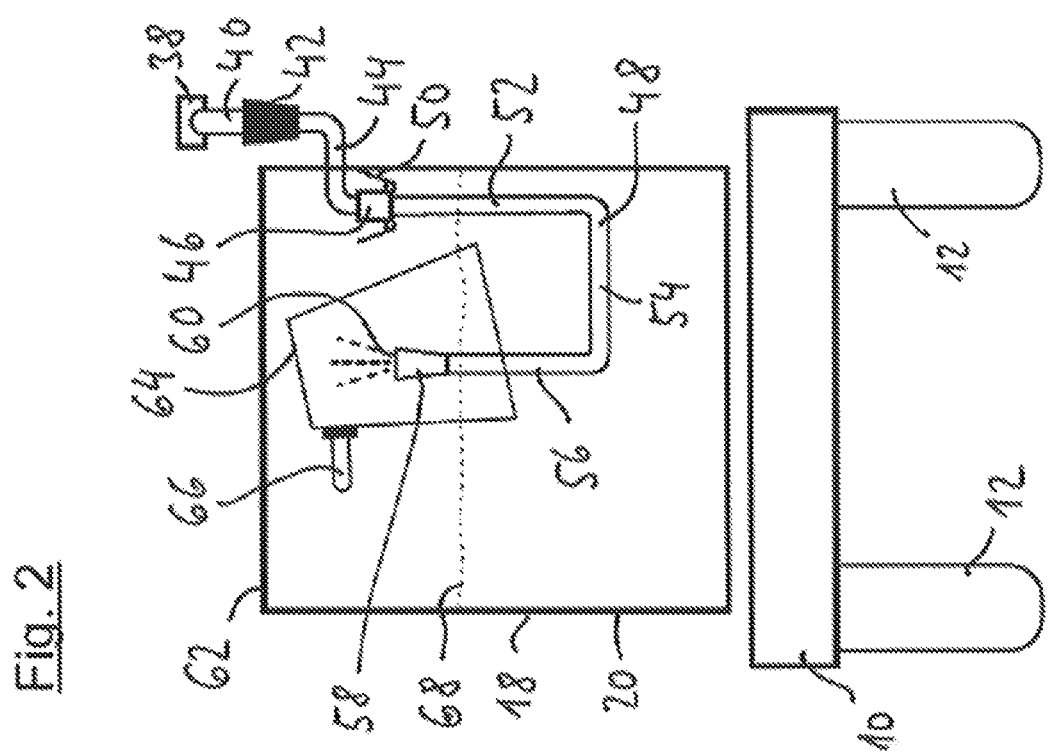
FIG. 2 shows a front schematic view of the milk cart from FIG. 1.

Considering FIGS. 1 and 2 together, it can be seen that the U-shaped section 48 of the return line has a first portion or first bracket 52 leading substantially downward, which begins at the coupling 46 and extends from there to a substantially horizontally arranged base portion or base 54 of the U-shaped section. The first bracket 52 runs close to the tank wall 20. A second portion or second bracket 56 of the U-shaped section 48 is slightly shorter than the first bracket 52. It forms an end section of the return line which is arranged substantially vertically and runs from bottom to top, where it ends at its upper end with a spray nozzle 58 which has several openings 60. The second bracket 56 is slightly shorter than the first bracket 52 of the U-shaped section 48, so that the spray nozzle 58 is located slightly below the coupling 46. It is located at a height of about 20 cm below an upper rim 62 of the storage tank 18.

The milk cart also has a controller C, which is shown schematically in FIG. 1, and which controls in particular the conveyor system 30. By pressing a button B on handlebar 16 or on a control unit on grip 38 of dosage arm 36, conveyor system 30 can be activated for a specified period of about 45 seconds in the example.

For cleaning a feeding bucket 64, for example, which has a teat 66 (see FIG. 2), the storage tank 18 is filled up to a fill level 68 with a cleaning liquid slightly below the spray nozzle 58. When the conveyor system 30 is activated, liquid jets emerge laterally and upwards from the openings 60 on the spray nozzle 58, which are used for thorough cleaning of a feeding bucket 64 that has been put over the end section. At the same time, the outside of the feeding bucket 64 can be cleaned, for example by hand using a brush.

LIST OF REFERENCE CHARACTERS 10 chassis
12 rear wheel
14 front wheel
16 handlebar
18 storage tank
20 tank wall
22 tank bottom
24 outlet
26 conduit
28 inlet
30 conveyor system
32 exit
34 hose
36 dosage arm
38 grip
40 front end
42 receptacle
44 middle section
46 coupling
48 U-shaped section
50 locking lever
52 first bracket
54 base
56 second bracket/end section
58 spray nozzle
60 opening
62 upper rim
64 feeding bucket
66 teat
68 fill level

The invention claimed is:
1. A milk cart comprising:
a chassis;
a storage tank configured to hold a liquid, the storage tank being coupled to the chassis; and a conveyor system comprising an exit configured to connect to a return line that terminates inside the storage tank, wherein the return line comprises,
- a first portion positioned inside of the storage tank and extending in a downward direction to a first portion end positioned within the storage tank and towards a bottom of the storage tank,
- a base portion positioned inside the storage tank and extending from the first portion end to a base portion end and positioned below a fill level of the liquid, and
- a second portion positioned inside the storage tank and extending from the base portion end in an upward direction away from the bottom of the storage tank and terminating at an upper end inside the storage tank, wherein the upper end comprises at least one opening, wherein the second portion is positioned at a lateral distance from an interior of a wall of the storage tank such that the upper end of the second portion is free-standing within the storage tank.

2. The milk cart according to claim 1, wherein the at least one opening is positioned at a height from 0-30 cm below an upper rim of the storage tank.

3. The milk cart according to claim 1, wherein the lateral distance of the second portion of the return line from the interior of the wall of the storage tank is at least 10 cm.

4. The milk cart according to claim 1, wherein the second portion of the return line is positioned at a lateral distance from a central vertical axis of the storage tank.

5. The milk cart according to claim 1, wherein the second portion of the return line comprises a length of at least 15 cm.

6. The milk cart according to claim 1, wherein the first portion, second portion, and the base portion of the return line are connected to form a U-shaped section positioned inside the storage tank that is configured to accept a feeding bucket.

7. The milk cart according to claim 1, wherein the return line further comprises a delivery device positioned outside the storage tank and configured to connect to the exit of the conveyor system.

8. The milk cart according to claim 7, wherein the return line further comprises a middle section configured to pass from outside of the storage tank to inside of the storage tank.

9. The milk cart according to claim 8, wherein the middle section of the return line is configured to connect to a delivery device positioned outside of the storage tank.

10. The milk cart according to claim 9, wherein a portion of the return line positioned inside the storage tank is configured to be detachably connected to the middle section of the return line.

11. The milk cart according to claim 1, further comprising a filter positioned at an outlet of the storage tank.

12. The milk cart according to claim 1, further comprising a conduit configured to connect an inlet of the conveyor system to an outlet positioned at the bottom of the storage tank and a filter positioned within the conduit.

13. The milk cart according to claim 1, wherein the milk cart comprises a controller configured to activate the conveyer system in a cleaning mode for a predetermined period of time.

14. The milk cart according to claim 1, further comprising a spray nozzle positioned over the upper end of the second portion of the return line, and wherein the spray nozzle is configured to generate a plurality of liquid jets when the liquid is conveyed by the conveyor system.

15. A method of cleaning a feeding container by a milk cart that comprises a chassis, a storage tank for liquid foodstuff, and a conveyor system comprising an inlet connected to an outlet of the storage tank, the method comprising:
- filling the storage tank for liquid foodstuff with a cleaning liquid;
- structuring the conveyor system to include,
  - a first portion positioned inside of the storage tank and extending in a downward direction to a first portion end positioned within the storage tank and towards a bottom of the storage tank,
  - a base portion positioned inside the storage tank and extending from the first portion end to a base portion end and positioned below a fill level of the cleaning liquid, and
  - a second portion positioned inside the storage tank and extending from the base portion end in an upward direction away from the bottom of the storage tank and terminating at an upper end inside the storage tank, wherein the upper end comprises at least one opening, wherein the second portion is positioned at a lateral distance from an interior of a wall of the storage tank such that the upper end of the second portion is free-standing within the storage tank;
- positioning the feeding container over the second portion of the conveying system located inside the storage tank for the liquid food stuff; and
- cleaning an interior of the feeding container using one or more jets of cleaning liquid produced by the second portion of the conveyor system while the feeding container is located inside the storage tank.

16. The method according to claim 15, further comprising a return line extending from the conveyor system, and wherein the one or more jets of cleaning liquid are expelled from the second portion of the return line positioned within the storage tank for the liquid food stuff and extending along a vertical axis of the storage tank.

17. The method according to claim 15, further comprising removing the feeding container from the storage tank for the liquid food stuff after the cleaning.

* * * * *